United States Patent
Helfer et al.

[11] Patent Number: 6,146,760
[45] Date of Patent: Nov. 14, 2000

[54] HIGH STRENGTH CORD

[75] Inventors: Farrel Bruce Helfer; Dong Kwang Kim, both of Akron; Robert Martin Shemenski, North Canton; Italo Marziale Sinopoli, Canton, all of Ohio; Guy Jeanpierre, Bissen, Luxembourg; Gia Van Nguyen, Arlon, Belgium

[73] Assignee: The Goodyear Tire & Rubber Company, Akron, Ohio

[21] Appl. No.: 08/879,860

[22] Filed: Jun. 20, 1997

Related U.S. Application Data

[63] Continuation of application No. 07/843,133, Feb. 28, 1992, abandoned, which is a continuation of application No. 07/575,027, Aug. 30, 1990, abandoned, which is a continuation-in-part of application No. 07/496,759, Mar. 21, 1990, Pat. No. H001333, and application No. 07/415,948, Oct. 2, 1989, Pat. No. 4,960,473.

[51] Int. Cl.$^7$ .................................................. D02G 3/36
[52] U.S. Cl. .................. 428/377; 428/295.1; 428/379; 428/390; 57/212; 57/217; 57/218; 57/243; 57/902
[58] Field of Search ................... 428/377, 295.1, 428/379, 390; 57/212, 217, 218, 243, 902

[56] References Cited

U.S. PATENT DOCUMENTS

| | | |
|---|---|---|
| 4,408,444 | 10/1983 | Baillievier ................................. 57/237 |
| 4,506,500 | 3/1985 | Myauchi et al. ........................... 57/212 |
| 4,516,395 | 5/1985 | Palmer et al. ............................. 57/237 |
| 4,545,190 | 10/1985 | Rye et al. .................................. 57/212 |
| 4,737,392 | 4/1988 | Dambre ..................................... 428/36 |
| 4,960,473 | 10/1990 | Kim et al. ............................. 148/12 B |
| 4,966,216 | 10/1990 | Kawasaki et al. ....................... 152/556 |

FOREIGN PATENT DOCUMENTS

| | | |
|---|---|---|
| 0076882 | 4/1991 | Japan . |
| 93195455 | 8/1993 | Japan . |

*Primary Examiner*—Christopher Raimund
*Attorney, Agent, or Firm*—T P Lewandowski

[57] ABSTRACT

Steel reinforcing cords (36) having four or more filaments (38, 40, 42 and 44) in two groups, one twisted and the other untwisted with a filament tensile strength TS equal to $K_1-K_2 D$ where $K_1=4080 N/mm^2$, and D is a filament diameter in mm to form cords with a break load equal to $N(720.40D^2-352.6D^3)$; CE is the cord efficiency, D is the filament diameter in millimeters and N is the number of filaments.

5 Claims, 2 Drawing Sheets

HIGH STRENGTH CORD

This is a continuation of application(s) Ser. No. 07/843,133, filed on Feb. 28, 1992; now abandoned, which is a continuation of Ser. No. 07/575,027 filed Aug. 30, 1990, now abandoned, which is a CIP of U.S. application Ser. No. 07/496,759 filed Mar. 21, 1990, now U.S. Pat. No. H001,333, and with assignee's U.S. application Ser. No. 07/415948 filed Oct. 2, 1989, now U.S. Pat. No. 4,960,473 which discloses steel alloys for reinforcing wires/filaments for rubber products with increased strength and ductility and their process of manufacture which is hereby incorporated by reference thereto.

The present invention relates to cord and cord reinforced plies.

Particularly, the present invention relates to a cord reinforced composite having rubber where preferably the structure is for reinforcing tires.

Reinforced elastomeric articles are well known in the art for example for conveyor or like type belts, tires etc. Cords made of multi twisted filaments of fine wire with two or more filaments in a single strand construction having a wrap filament therearound to reinforce the above structure have also been known. More recently multi strand and multi-layer cords such as 2+7x.22+1 have been found necessary to meet the higher demand of durability for composites in tire belts but are more expensive to make. Even more recently, there has been use of single strand cords of multi filaments which are not twisted about each other but rather twisted altogether as a bundle or bunch to simplify the cord construction and multi-directional cords. Higher fatigue life requirements for composites in tires have resulted in cords with smaller filament diameter requiring more filaments in the cord to obtain the necessary strength.

Most recently two ply tire belts for passenger and light truck tires have been used having cords of 2x.30HT and 2+2x.30HT, respectively. An example of the 2x cord can be found in Assignee's prior application, now published as EP 0 237462 on Sep. 16, 1987. These cords were made of high tensile (HI) steel of a carbon content by weight greater than 0.80% which was of a lesser strength than the above steel alloys which will be referred to herein as super tensile (ST).

Many problems have had to be overcome even after development of the above steel alloys and filaments. The higher strength steel alloys resulted in changes in cord modulus giving rise to the possibility of adjusting the parameters of a tire belt gross load described in the above identified 2x cord application as depending upon three factors assuming adequate cord to rubber adhesion. The factors are cord modulus, the ratio of cord volume to rubber volume which is often expressed as the number of cord ends per inch, and the angle of cord reinforcement. An increase in the above-mentioned two other cord related factors generally results in an increase of weight for the belt. Added weight means added cost and higher rolling resistance of a tire. Lighter cords with a lower modulus do not solve the problem because even though they have lower weight they also have a lower cord modulus which must be offset by increasing the ratio of cord to rubber volume. This increase in cord volume is limited by the physical size of the cord and the resulting spacing between the cords which governs the ability of the rubber to penetrate between the cords for good cord to rubber adhesion.

The challenge was to determine cord structure which could take advantage of the new cord modulus while not adversely affecting cord volume to rubber volume ratio on lateral reinforcement.

After considerable study, effort, testing and time, the present invention provided cords with a substantially reduced number of filaments. While a reduction in the number of filaments would lead one to expect a reduction in weight, this would not necessarily be the case where the filament size was increased. Under such circumstances, cord was found for use by varying the ends per inch (EPI) in the plies of the belt. Other advantages which exist in the present invention include a reduction in the cord gum coat gauge between the cord layers in a belt and a weight reduction due to reduction in weight of reinforcement as well as reduction in an amount of gum gauge. This also results in a reduction in cost for the composite of the present invention.

As indicated below, the present invention will be shown to have substantially maintained the gross load for a tire belt while reducing weight and cost using stronger filament in cord constructions not useable previously, even with high tensile filaments, and accompanying cord volumes and angles which reduce material in the belt. Similar advantages can be and have been achieved with other composites such as carcass plies as well.

A cord for a reinforced composite structure according to the present invention is preferably made of multiple filaments having a diameter range of 0.30 to 0.39 mm, each filament made of steel having at least a tensile strength (TS) defined by the expression: $TS = K_1 - K_2 D$ where $K_1 = 4080$ N/mm$^2$, $K_2 = 2000$ N/mm$^2$ and D is the filament diameter in mm.

Also included is a cord of the U+T type for reinforcing elastomeric structures with two groups of filaments in the cord, group T being twisted and group U untwisted with the two groups twisted about each other comprising, at least three filaments all having the same pitch and twist direction, said cord made of steel having a cord breaking load (CBL) in pounds defined by the expression: $CBL = N(720.4D^2 - 352.6D^3)CE$ where CE is the cord efficiency, D is the filament diameter in millimeters and N is the number of filaments in the cord.

Further, the above cords are of a simpler construction over predecessor multi-layer cords, taking the form of 2+2, 3+2, 3+3 and U+T where T and U represent the number of filaments in each group forming the cord. By varying the filament size, cord constructions for several tire belts or composites can be obtained.

Also included is a cord of the U+T type for reinforcing elastomeric structures with two groups of filaments in the cord, group T being twisted and group U untwisted with the two groups twisted about each other comprising at least three filaments all having the same pitch and twist direction, said cord made of steel having at least a tensile strength (TS) defined by the expression: $TS = K_1 - K_2 D$ where $K_1 = 4080$ N/mm$^2$, $K_2 = 2000$ N/mm$^3$ and D is the filament diameter in mm.

Further included is a cord of the U+T type for reinforcing elastomeric structures with two groups of filaments in the cord, group T being twisted and group U untwisted with the two groups twisted about each other comprising at least three filaments all having the same pitch and twist direction, said cord made of steel having a content by weight of between 0.78% and 0.86% carbon, 0.3% and 1.0% Si and between 0.1% and 0.5% of an alloying element from a class of the following elements: Cr, Ni, Co, W, Mo, V and Nb and any combination thereof, the balance being iron and residuals.

The above cords have the advantages of a 7 to 9% increase in cord breaking load over a predecessor cord of the same construction made of high tensile steel.

Further, all of the above cords result-in lower linear density in the reinforcement for which they are used which again results in less weight and lower cost for the reinforcement and its product, be it tire, belt or any other reinforced elastomeric.

The above advantages of the invention will become readily apparent to one skilled in the art from reading the following detailed description of an embodiment of the invention when considered in the light of the accompanying drawings in which

As used herein and in the claims: "Carcass" means the tire structure apart from the belt structure, tread, undertread, and sidewall rubber over the plies, but including the beads. "Cord" means one or more of the reinforcement elements, formed by one or more filaments/wires which may or may not be twisted or otherwise formed which may further include strands so formed which strands may or may not be also so formed, of which the plies in the tire are comprised. "Super Tensile Steel" (ST) means a steel as defined in the above referenced application Ser. No. 07/415948, or a tensile strength of at least $TS=K_1-K_2D$ where $K_1=4080$ N/mm², $K_2=2000$ N/mm² and D is the filament diameter in mm.

Figure 4:
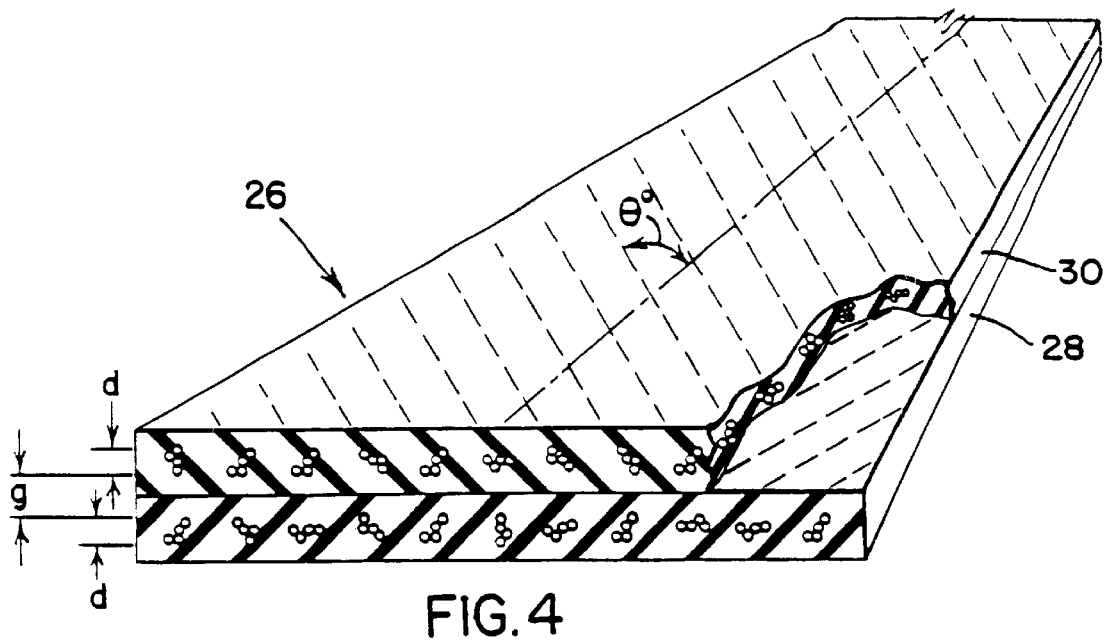
FIG. 4 is a schematic of a composite in accordance with the present invention.
Figure 1:
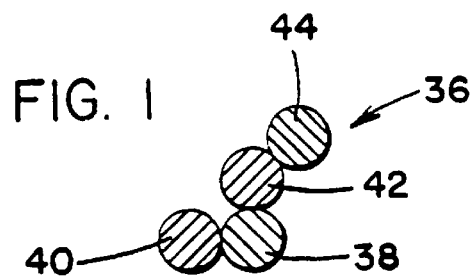
FIGS. 1–3 are cross sections through cords in accordance with an embodiment of the present invention.
Figures 2, 3:
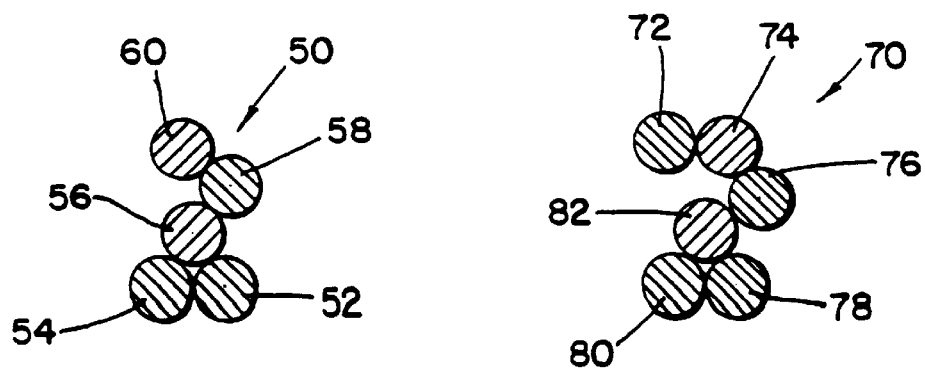
Figure 5:
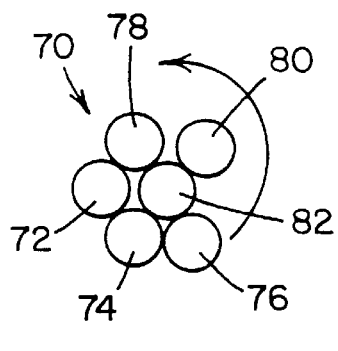
FIGS. 5–13 are schematics of cross sections through a cord in accordance with the present invention illustrating an idealized geometric shape taken along the axial length of one twist of the cord.
Figure 6:
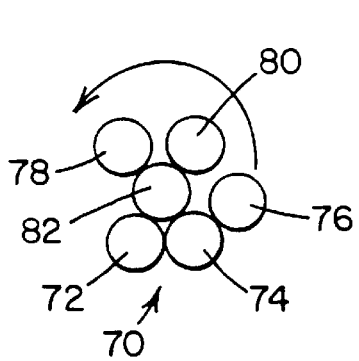
Figure 7:
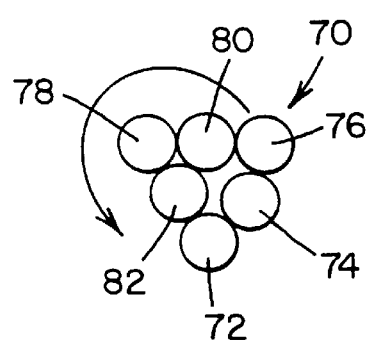
Figure 8:
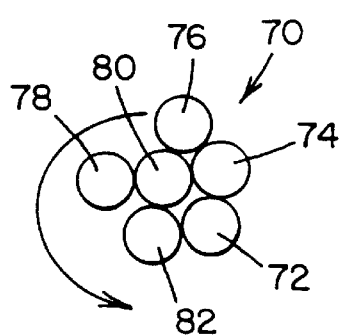
Figure 9:
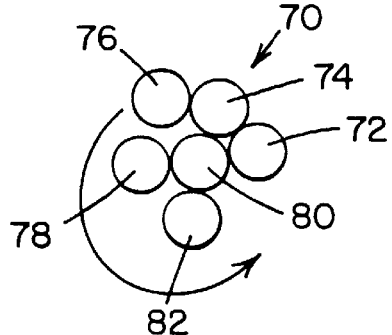
Figure 10:
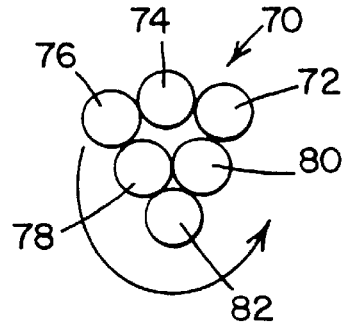
Figure 11:
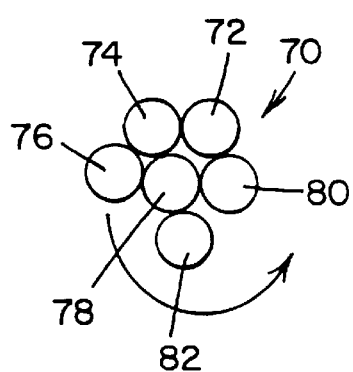
Figure 12:
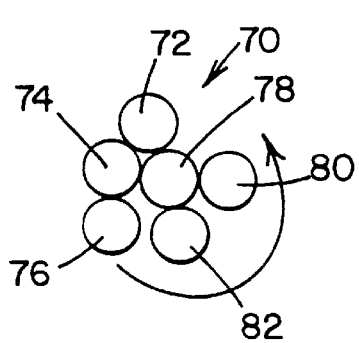
Figure 13:
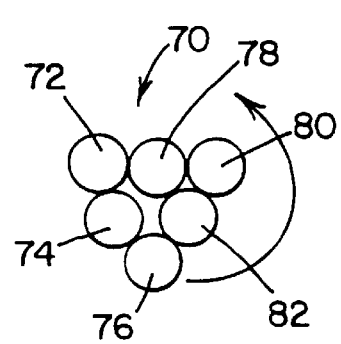

Steel reinforcing cords 36 according to the present invention (see FIGS. 1–3) are characterized by the cords 36 having filaments 38,40,42 and 44 with a tensile strength of at least 3380 N/mm².

Preferably the cords 36 are comprised of four filaments of finely drawn super tensile steel wire. As noted in the application incorporated by reference above, there are a number of metallurgical embodiments which result in the tensile strength defined above as super tensile (ST).

The cords 36 used in the working example have a structure of four filaments 38,40,42 and 44 of 0.35 mm diameter super tensile steel wire and a cord 36 break strength of 1258 Newtons plus or minus 70 Newtons. Each cord 36 has two filaments 38,40 twisted together with a 16 mm lay length and these two filaments 38,40 are twisted at a 16 mm lay length together with the remaining two filaments 42,44 which are untwisted and parallel to each other when twisted together with the twisted filaments 38,40 all in the same twist direction. This cord is designated as 2+2x.35ST. The 2+2 construction is known for its openness and good rubber penetration resulting from the openness. The 0.35 designates the filament diameter in millimeters and the ST designates the material being super tensile.

Other cords produced included 3+2x.35ST and 3+3x.35ST.

These cords have particular application to composites for truck tires when replacing former constructions.

By comparing the ratio of strength (STR) of the cord divided by the linear density (LD) of the cords (STR/LD) advantages of the cords become apparent:

TABLE 1

|  | STRENGTH (N) | LINEAR DENSITY Mg/Meters | STR/LD |
|---|---|---|---|
| Former Cords |  |  |  |
| 3 x .265/9 x .245 HT + 1 | 1810 +/ 100 | 4845 | .37 |
| 3 x .20 + 6 x .35 HT | 1850 +/ 107 | 5400 | .34 |
| 3 + 9 + 15 x .22 + 1 | 2750 +/ 150 | 8470 | .32 |
| Present Cords |  |  |  |
| 2 + 2 x .35 ST | 1254 +/ 67 | 3048 | .42 |
| 3 + 2 x .35 ST | 1568 +/ 80 | 3773 | .42 |
| 3 + 3 x .35 ST | 1881 +/ 100 | 4527 | .42 |

By comparing the ratio of strength to the linear density of the cords it can be seen that the ratio is always higher for the present cords. It will be shown below how the increased STR/LD of the above constructions can be utilized to make composites that at equal inch strength yield lower total weight.

For example, Former Cord 3x.265/9x.245HT+1 at an EPI of 12 (4.7 ends/cm) and a minimum cord strength of 1708 Newtons yields a composite strength of 8071 Newtons per cm. If the gauge of calendered gum applied to the cords is maintained the same for all cords, the following table results:

TABLE 2

|  | END COUNT | CORD STRENGTH | |
|---|---|---|---|
|  | ENDS PER CM Per In | MIN N | AVG N |
| Former Cords |  |  |  |
| 3 x .265/9 x .245 HT + 1 | 4.7 (12) | 1708 | 1810 |
| 3 x .20 + 6 x .35 HT | 4.3 (11) | 1743 | 1846 |
| 3 + 9 + 15 x .22 + 1 | 3.1 (8) | 2598 | 2749 |
| Present Cords |  |  |  |
| 2 + 2 x .35 ST | 6.9 (17.5) | 1188 | 1259 |
| 3 + 2 x .35 ST | 5.5 (14.0) | 1486 | 1575 |
| 3 + 3 x .35 ST | 4.5 (11.5) | 1779 | 1877 |

|  | 1000 in² of Composite | | | |
|---|---|---|---|---|
|  | WEIGHT | | | |
|  | CORD Kg | GUM Kg | TOTAL Kg | STRENGTH N/CM |
| Former Cords |  |  |  |  |
| 3 x .265/9 x .245 HT + 1 | 1.48 | 1.32 | 2.81 | 8071 |
| 3 x .20 + 6 x .35 HT | 1.68 | 1.37 | 3.05 | 7919 |
| 3 + 9 + 15 x .22 + 1 | 1.72 | 1.50 | 3.21 | 8183 |
| Present Cords |  |  |  |  |
| 2 + 2 x .35 ST | 1.34 | 1.32 | 2.66 | 8183 |
| 3 + 2 x .35 ST | 1.34 | 1.38 | 2.72 | 8190 |
| 3 + 3 x .35 ST | 1.32 | 1.40 | 2.72 | 8057 |

Table 2 above in the last column gives the composite strengths in Newtons per centimeter of all composites with the noted cords and End Counts (ends per cm) all of which are in the 8000 range and considered equal. The Former Cords are listed first and the Present Cords, which are according to the invention, are listed below with the Former Cords replaceable by the Present Cords. The increase in STR/LD of the Present Cords over the former permits flexibility in cord use making the Present Cords interchangeable in composites with the proper end count. In each instance, cord according to the present invention is simpler in construction having fewer filaments. While the cord strength is less than the cord it replaces, the EPI and additional strength of the super tensile filament material allow the composites to have equal strength. However, the present cords can be seen to have less weight with the results that a lighter weight composite is obtained with equal inch strength which can contribute to a more fuel efficient tire. Further, the above weight reduction is amplified by an accompanying reduction in composite cost of up to 18%.

Table 3, below, gives a direct comparison between a number of 4 filament cords of high tensile HT and super tensile ST of varying filament diameters showing an increase in strength in al cases. The table gives values in Newtons for the CBL formula $N(720.4D^2-352.6D^3)$ CE given above in pounds where CE is the efficiency of the cord, i.e. the difference between the cord break load over the value of the filament break load times the number of filaments in the cord. The values in each case can be measured by breaking each (cord and filament) and the efficiency calculated using the values measured. Note that not all the cord samples in Table 3 became candidates noted above.

TABLE 3

CORD STRENGTH
Strength in Newtons = Filament Break Load ×
Number of Filaments × CE (.97)

| CORD | HT Tensile of | | ST Tensile of | |
|---|---|---|---|---|
| | Avg | Min | Avg | Min |
| 2 + 2 × .30 | 890 | 845 | 952 | 903 |
| 2 + 2 × .325 | 1032 | 979 | 1103 | 1050 |
| 2 + 2 × .35 | 1188 | 1125 | 1259 | 1188 |
| 2 + 2 × .38 | 1370 | 1303 | 1437 | 1388 |
| 3 + 2 × .35 | 1486 | 1406 | 1575 | 1486 |
| 3 + 3 × .35 | 1779 | 1686 | 1877 | 1779 |

Another advantage of the Present Cord over the former is that their construction is more open to penetration by the calendered gum resulting in their being more resistant to corrosion propagation. Table 4 below makes a comparison of pull out force and observed gum coverage for various cords initially and after two days of steam aging.

TABLE 4

| | ORIGINAL % | | STEAM AGED % | |
|---|---|---|---|---|
| | N | Coverage | N | Coverage |
| Former Cord | | | | |
| 3 × .265/9 × .245 HT + 1 | 829 | 90 | 674 | 80 |
| 3 + 9 + 15 × .22 + 1 | 931 | 90 | 763 | 80 |

TABLE 4-continued

| | ORIGINAL % | | STEAM AGED % | |
|---|---|---|---|---|
| | N | Coverage | N | Coverage |
| Present Cord | | | | |
| 3 + 2 × .35 ST | 739 | 90 | 749 | 90 |
| 2 + 2 × .35 ST | 644 | 90 | 638 | 90 |

It can be seen that the Present Cords retain their pull out force and coverage while the former cords drop in strength and coverage. Similar results were achieved with salt and humidity aging.

The Present Cords are stronger in cord strength allowing for use of fewer cords for equal strength. Those having larger diameter filaments result in substantial reduction in the number of filaments in the cord over former cords making use of U+T type constructions possible where previous strength levels ruled out such type constructions. The U+T type constructions are more open resulting in better adhesion and greater resistance to corrosion. Finally, as noted above, the new cords lead to reduction in weight of reinforcement in elastomers both from the reinforcement itself as well as from the elastomer.

In accordance with the provisions of the patent statutes, the principle and mode of operation of the cord have been explained and what is considered to represent its best embodiment has been illustrated and described. It should, however, be understood that the invention may be practiced otherwise than as specifically illustrated and described without departing from its spirit or scope.

We claim:

1. A cord of the U+T type for reinforcing elastomeric structures with two groups of filaments in the cord, group T being twisted and group U untwisted with the two groups twisted about each other comprising: at least two filaments in each group, all filaments having the same pitch and twist direction, said cord made of steel having a cord breaking load (CBL) in pounds defined by the expression: $CBL=N(720.4D^2-325.6D^3)CE$ where CE is cord efficiency in a range of 0.95 to 0.99, D is the filament diameter in millimeters in a range of 0.30 to 0.39 and N is the number of filaments in the cord, said steel for the cord having a composition by weight of between 0.78% and 0.86% to carbon, 0.3% and 1.0% Si and between 0.1% and 0.5% of an alloying element selected from the group consisting of: Cr, Ni, Co, W, Mo, V, N6, and any combination thereof with, the balance of the cord position being iron and residuals.

2. The cord in claim 1 wherein one group has three (3) filaments and N=5.

3. The cord in claim 1 wherein both groups have three (3) filaments and N=6.

4. The cord in claim 1, 2 or 3 where CE is 0.97.

5. The cord in claim 1, 2, or 3 where D is 0.35.

* * * * *